United States Patent Office 2,729,638
Patented Jan. 3, 1956

2,729,638

VAT DYESTUFFS OF THE PHTHALOYLCARBAZOLO TRIAZINE SERIES

Asa Willard Joyce, Plainfield, N. J., assignor to American Cyanamid Company, New York, N. Y., a corporation of Maine No Drawing. Application December 17, 1953, Serial No. 398,876

18 Claims. (Cl. 260—249)

This invention relates to a new series of vat dyestuffs which are 2-phthaloylcarbazolophenyl 4,6 alpha-anthraquinonylamino 1,3,5 triazines. The invention also includes a new series of intermediates from which the dyestuffs are made which are 2-(ortho-alpha-anthraquinonylamino phenyl) 4,6 di (alpha-anthraquinonylamino) 1,3,5 triazines. The carbazole containing dyestuffs have the formula

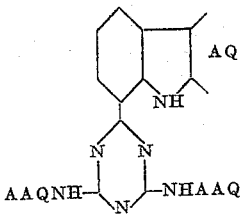

in which [AQ is an anthraquinone radical linked to the NH at an alpha position and AAQ is an alpha-anthraquinonyl radical. The intermediates have the formula

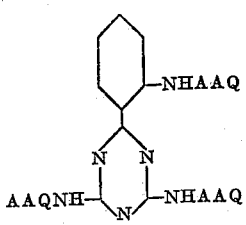

in which AAQ stands for an alpha-anthraquinonyl radical.

More specifically in a preferred embodiment the invention relates to 2-carbazolophenyl triazine dyestuffs having the formula given above in which the group AQ contains an alpha-benzoylamino group.

The preferred dyestuffs not only have high fastness and excellent dyeing properties but they are almost unique among triazine vat dyes in their color. Triazine vat dyes which contain an aryl group and two anthraquinonyl groups are in general yellows to reds. There has long been a demand for triazine vat dyestuffs having a deeper shade and it is an important property of the preferred dyestuffs of the present invention that they possess colors from brown to bordeaux to olive green. It is not known why the new series of triazine vat dyestuffs possess these deep shades, especially those of a greenish shade, when the known triazine vat dyes are yellows to reds and it is not intended to limit the invention to any theory of why the carbazole or anthraquinonylaminophenyl groups show so marked a color difference.

The invention is not limited to any particular process of producing the dyestuffs. It is however an advantage that they can be produced by a very simple process in good yield and without operating difficulties. The process as applied to the preferred dyestuffs which contain an alpha-benzoylamino group in the anthraquinone nucleus are represented by the following equation:

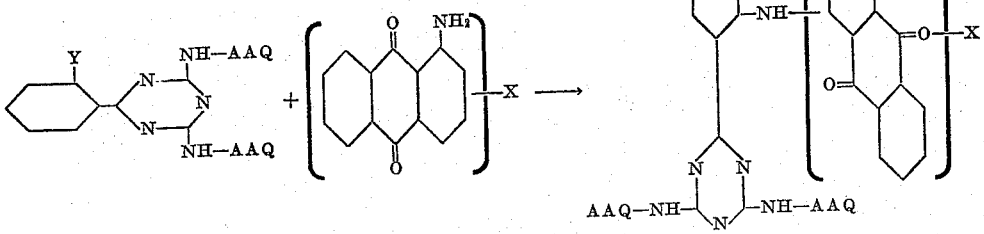
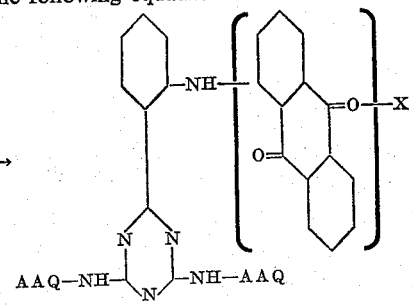

In this equation Y represents a halogen atom, X is an alpha-benzoylamino groups and AAQ stands for the alpha-anthraquinonyl radical. The alpha-anthraquinonylphenyl triazines obtained by the condensation can then be ring closed to the corresponding carbazoles. It is an advantage of the present invention that the first step can be simply effected using high boiling inert solvents such as naphthalene, nitrobenzene, dichlorobenzene, and the like in the presence of a cupriferous substance which exerts its well-known catalytic effect and an acid binding agent such as sodium carbonate, sodium acetate or the like to unite with the hydrogen halide set free by the reaction. The ring closure is likewise effected simply by a procedure which presents no operating problems and which may advantageously use an acid ring closing agent such as aluminum chloride. The ring closing step is also preferably carried out in a solvent such as nitrobenzene.

The alpha-benzoylamino group may be unsubstituted or it may carry substituents such as alkyl or alkoxy. Typical of such substituted alpha-benzoylamino groups are ortho-toluylamino or anisoylamino.

The invention will be described in greater detail in conjunction with the following specific examples in which the parts are by weight unless otherwise specified.

*Example 1*

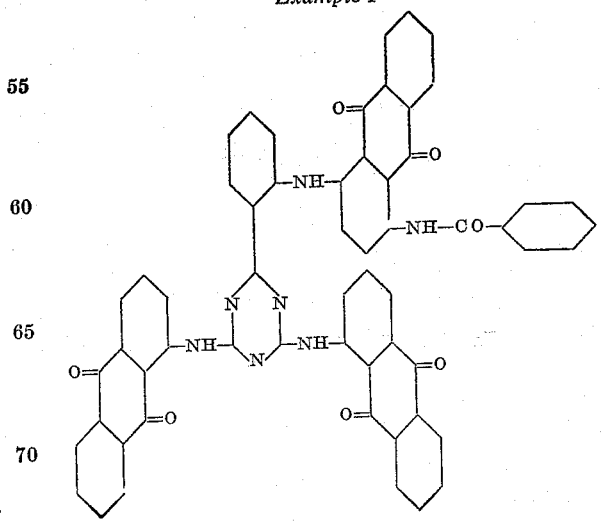

One hundred parts of naphthalene are melted at 100° C. To this is added 12.7 parts of 2-(o-chlorophenyl)-4,6-di-(alpha-anthraquinonyl) 1,3,5-triazine, 6.9 parts of 1-amino-4-benzamidoanthraquinone, 5 parts of sodium carbonate, 3 parts of anhydrous sodium acetate, and 0.5 part of cuprous bromide. This mixture is stirred at 205° C. until the reaction is substantially complete. It is then cooled to 150° C. and diluted with 185 parts of chlorobenzene. The mixture is then cooled to 100° C. and the product is isolated by filtration and washing with chlorobenzene. The dye cake is steamed to remove solvent and then extracted with hydrochloric acid to remove inorganic materials. The dry product is a dark brown powder which dissolves in concentrated sulfuric acid with a green coloration, and dyes cotton strong, fast, olive green shades from a dark red vat.

*Example 2*

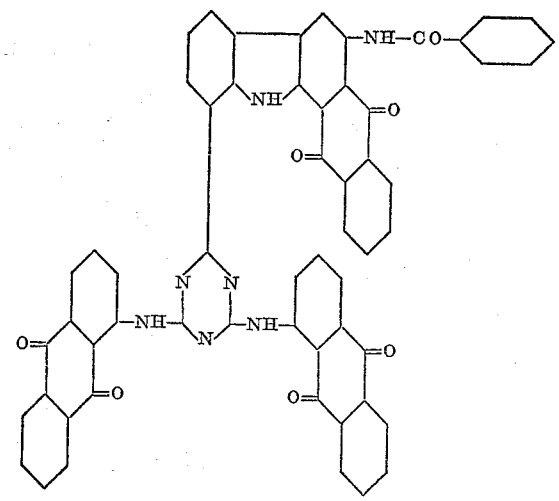

Twelve parts of anhydrous aluminum chloride and 40 parts of mononitrobenzene are fused at 50° C. Six parts of the dyestuff prepared in Example 1 is added gradually, and the melt is then heated gradually to 75° C. The mixture is then drowned in an excess of dilute sodium hydroxide. Mononitrobenzene is removed by steaming, and the product is isolated by filtration and washing. It is an olive green solid dyeing a somewhat yellower shade than the product of Example 1.

*Example 3*

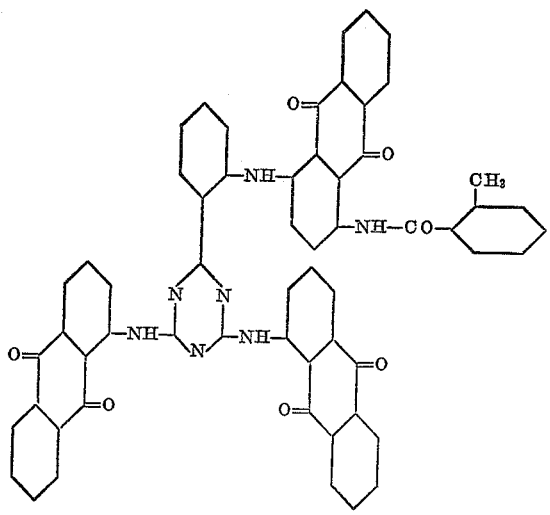

The procedure of Example 1 is repeated replacing the 1-amino-4-benzamidoanthraquinone with an equivalent amount of 1-amino-4-o-toluylamidoanthraquinone. A good yield of dyestuff is obtained which dyes cotton an olive green shade.

*Example 4*

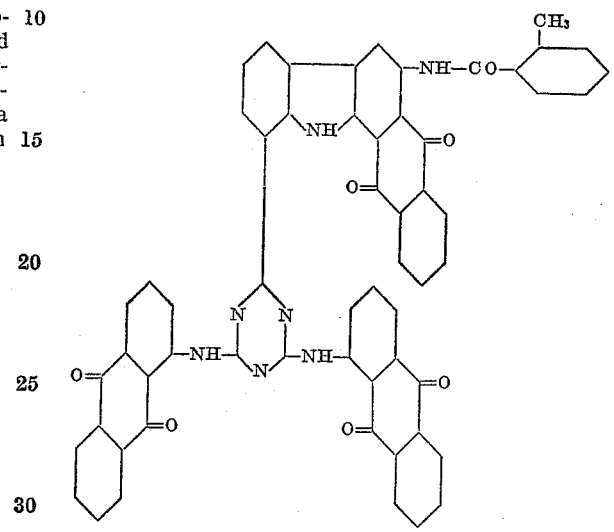

Twelve parts of anhydrous aluminum chloride and 40 parts of mononitrobenzene are fused at 50° C. Six parts of the dyestuff prepared in Example 3 is added gradually, and the melt is then heated gradually to 75° C. The mixture is then drowned in an excess of dilute soduim hydroxide. Mononitrobenzene is removed by steaming, and the product is isolated by filtration and washing. It is an olive green solid dyeing a somewhat yellower shade than the product of Example 3.

*Example 5*

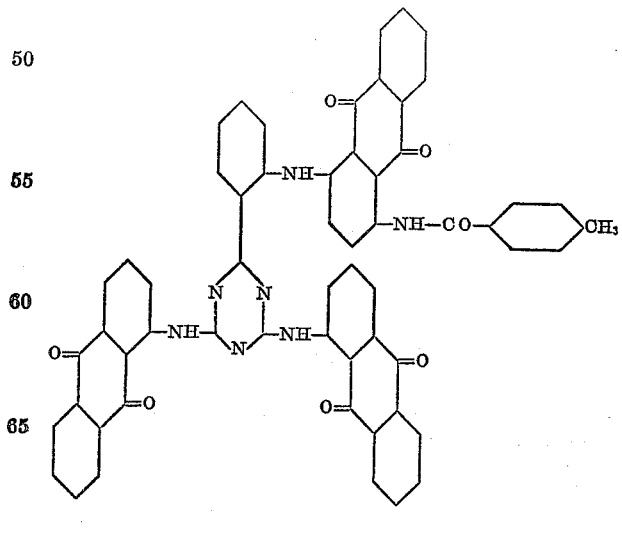

The procedure of Example 1 is repeated substituting for the 1-amino-4-benzamidoanthraquinone an equivalent amount of 1-amino-4-p-toluylamidoanthraquinone. A good yield of dyestuff is obtained which dyes a cotton a shade substantially similar to that of Example 3.

Example 6

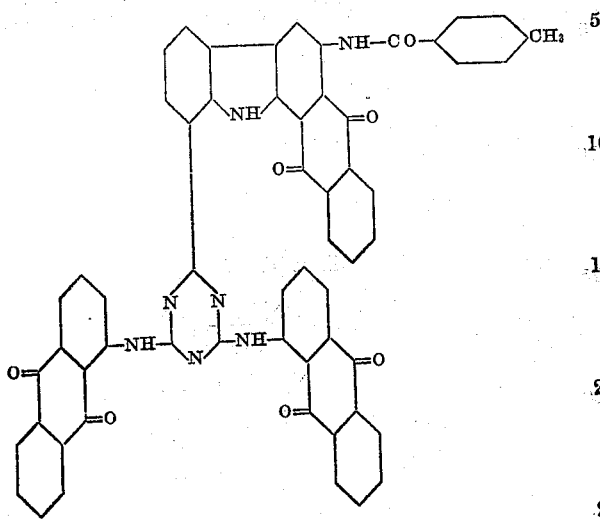

Twelve parts of anhydrous aluminum chloride and 40 parts of mononitrobenzene are fused at 50° C. Six parts of the dyestuff prepared in Example 5 is added gradually, and the melt is then heated gradually to 75° C. The mixture is then drowned in an excess of dilute sodium hydroxide. Mononitrobenzene is removed by steaming, and the product is isolated by filtration and washing. It is an olive green solid dyeing a somewhat yellower shade than the product of Example 5.

Example 7

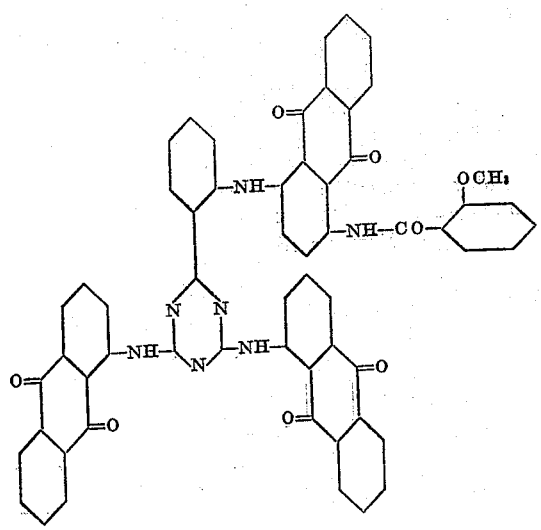

The procedure for Example 1 is repeated replacing the 1-amino-4-benzamidoanthraquinone with an equivalent amount of 1-amino-4-o-methoxybenzamidoanthraquinone. A good yield of dyestuff is obtained which dyes cotton an olive green shade. A similar result is obtained with 1-amino-4-p-methoxybenzamidoanthraquinone.

Example 8

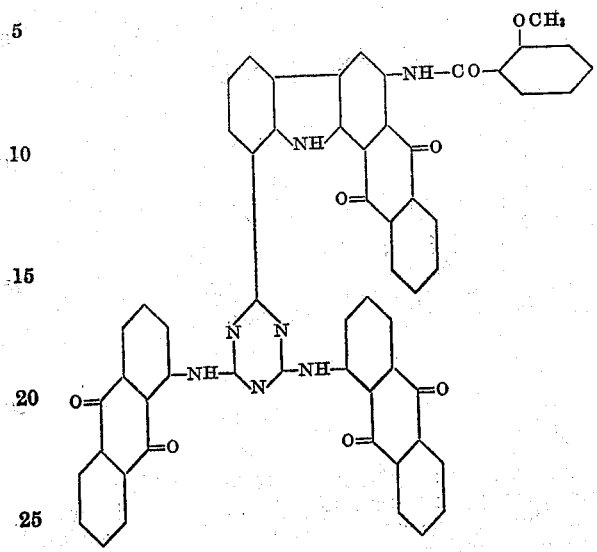

Twelve parts of anhydrous aluminum chloride and 40 parts of mononitrobenzene are fused at 50° C. Six parts of the dyestuff prepared in Example 7 is added gradually, and the melt is then heated gradually to 75° C. The mixture is then drowned in an excess of dilute sodium hydroxide. Mononitrobenzene is removed by steaming, and the product is isolated by filtration and washing. It is an olive green solid dyeing a somewhat yellower shade than the product of Example 7.

Example 9

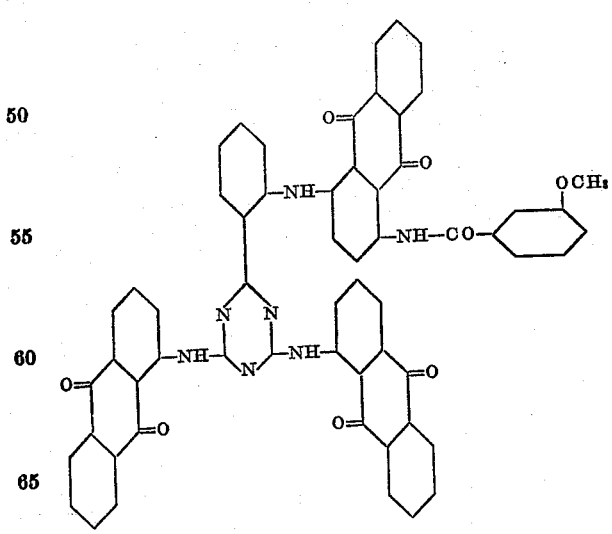

The procedure of Example 1 is repeated replacing the 1-amino-4-benzamidoanthraquinone with an equivalent amount of 1-amino-4-m-methoxybenzamidoanthraquinone. A good yield of the dyestuff is obtained which dyes cotton olive shades.

Example 10

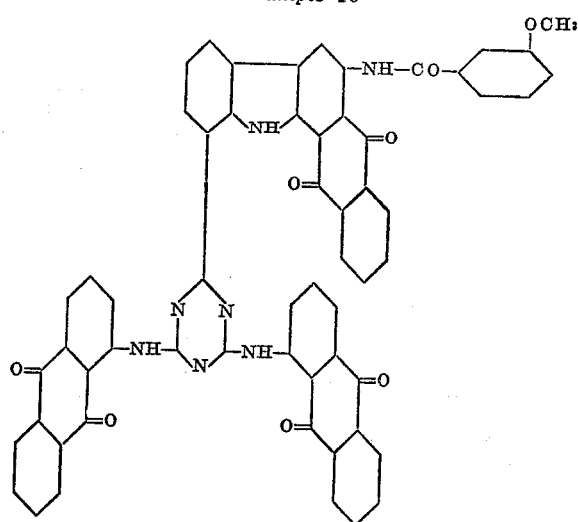

Twelve parts of anhydrous aluminum chloride and 40 parts of mononitrobenzene are fused at 50° C. Six parts of the dyestuff prepared in Example 9 is added gradually, and the melt is then heated gradually to 75° C. The mixture is then drowned in an excess of dilute sodium hydroxide. Mononitrobenzene is removed by steaming, and the product is isolated by filtration and washing. It is an olive green solid dyeing a somewhat yellower shade than the product of Example 9.

Example 11

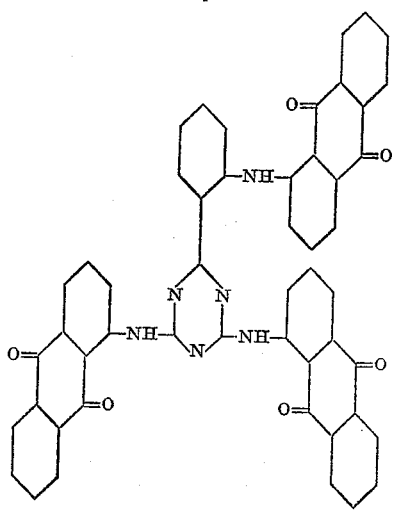

The procedure of Example 1 is followed replacing the 1-amino-4-benzamidoanthraquinone with an equivalent amount of alpha-aminoanthraquinone. The dyestuff is obtained in good yield which dyes cotton olive shades.

Example 12

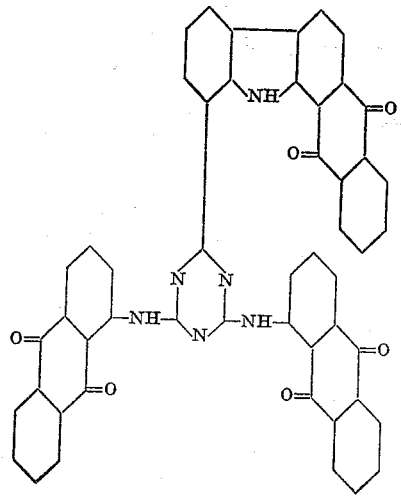

Twelve parts of anhydrous aluminum chloride and 40 parts of mononitrobenzene are fused at 50° C. Six parts of the dyestuff prepared in Example 11 is added gradually, and the melt is then heated gradually to 75° C. The mixture is then drowned in an excess of dilute sodium hydroxide. Mononitrobenzene is removed by steaming, and the product is isolated by filtration and washing. It is an olive green solid dyeing a somewhat yellower shade than the product of Example 11.

Example 13

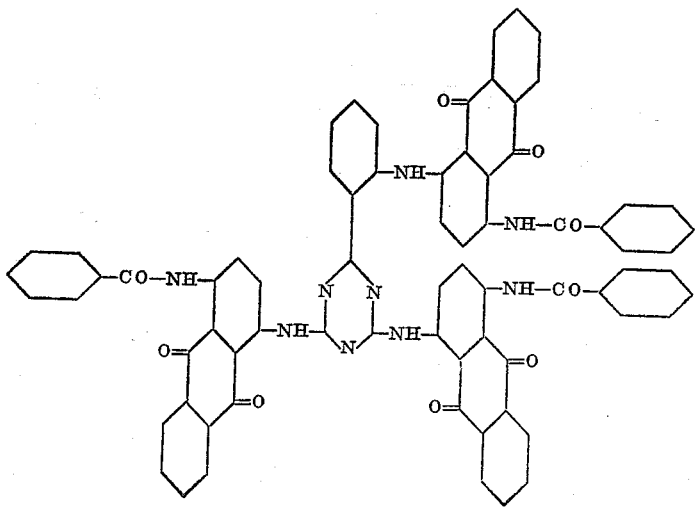

Ten and five-tenths parts of 2-(o-chlorophenyl)-4,6-di(4'-benzamido - 1' - anthraquinonylamino)-1,3,5-triazine, 4.1 parts of 1-amino-4-benzamidoanthraquinone, 3 parts of sodium carbonate, 1.5 parts of anhydrous sodium acetate, and 0.3 part of cuprous bromide are introduced into 75 parts of molten naphthalene at about 100° C. The mixture is then stirred at 205°–210° C. until the reaction is substantially complete. It is cooled to 150° C. and diluted with 100 parts of chlorobenzene. It is then cooled further to about 75° C., and the product is isolated by filtration and washing with chlorobenzene and acetone. The inorganic impurities are then removed by extraction with diluted hydrochloric acid. The dyestuff, obtained in excellent yield, dissolves in concentrated sulfuric acid with a red coloration, and dyes cotton Bordeaux red shades of good fastness and color value from a red brown vat.

Ten parts of anhydrous aluminum chloride and 40 parts of mononitrobenzene are fused at 60° C. Three and five-tenths parts of the product of Example 13 is added gradually and the mixture is stirred at 60°–65° C. until the reaction is substantially complete. The mixture is then drowned in an excess of dilute sodium hydroxide. The mononitrobenzene is removed by steaming, and the product is isolated by filtration and washing. An excellent yield is obtained of a product which dyes cellulose fabrics fast brown shades from a red vat.

*Example 15*

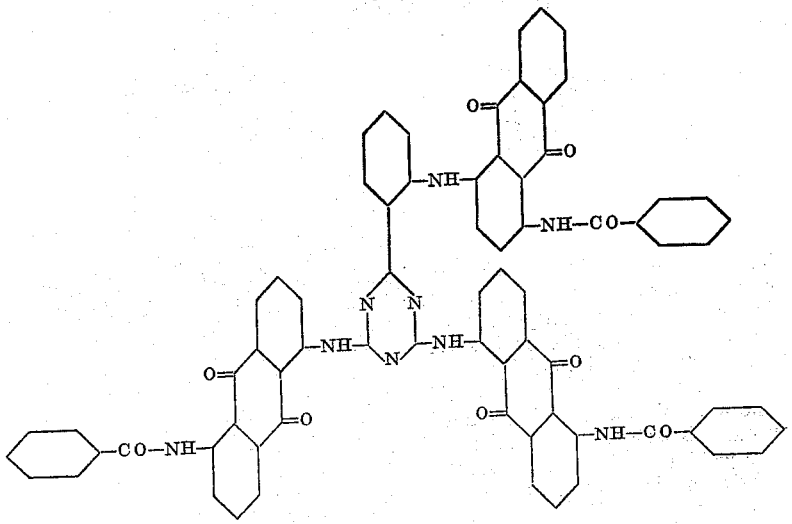

The procedure of Example 13 is followed but the starting material is replaced with the same weight of 2-(o-chlorophenyl) - 4,6 - di(5' - benzamido - 1' - anthraquinonylamino)-1,3,5-triazine. A dyestuff is obtained which dyes cotton a yellower shade of Bordeaux red than in the case of Example 13.

*Example 14*

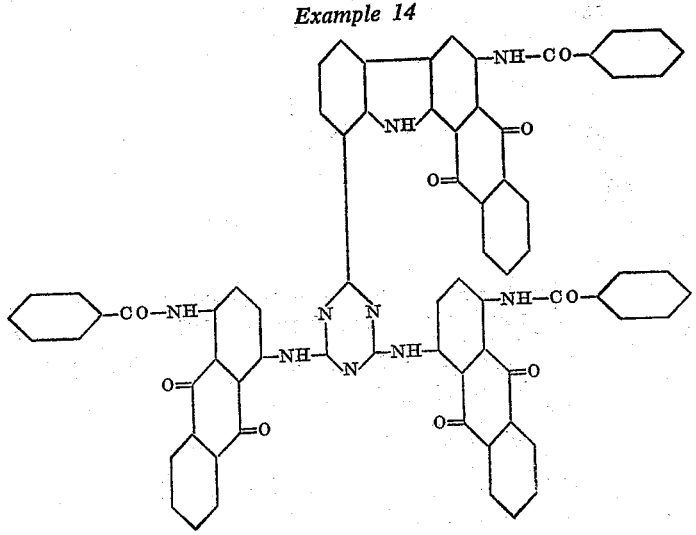

Example 16

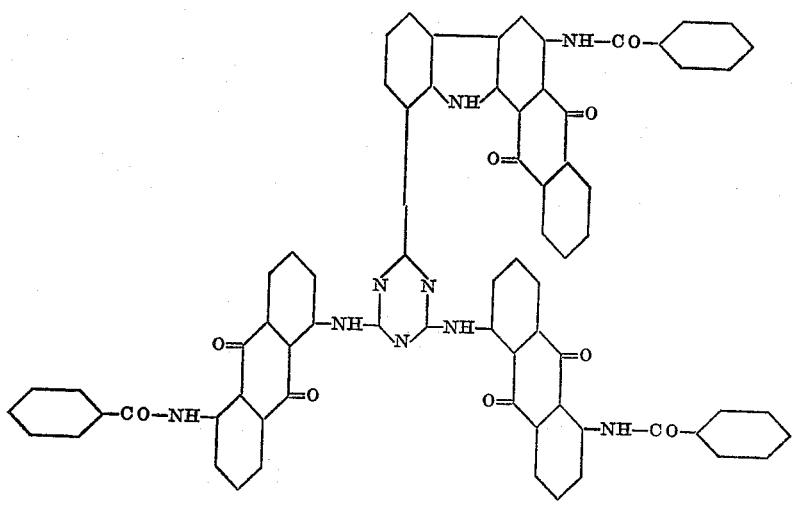

Ten parts of anhydrous aluminum chloride and 40 parts of mononitrobenzene are fused at 60° C. Three and five-tenths parts of the product of Example 15 is added gradually and the mixture is stirred at 60°–65° C. until the reaction is substantially complete. The mixture is then drowned in an excess of dilute sodium hydroxide. The mononitrobenzene is removed by steaming, and the product is isolated by filtration and washing. An excellent yield is obtained of a production which dyes cellulose fabrics fast brown shades from a red vat.

Example 17

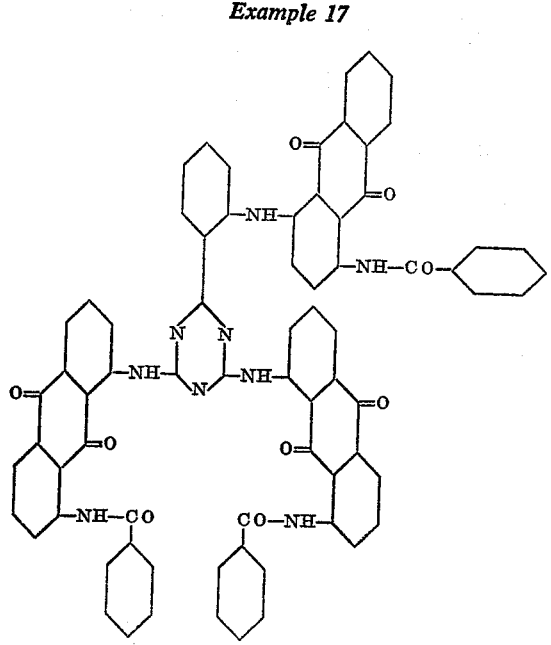

The procedure of Example 15 is repeated replacing the starting material of the same weight of 2-(o-chlorophenyl) - 4,6 - di(8' - benzamido - 1' - anthraquinonylamino) - 1,3,5-triazine. A dyestuff is obtained which dyes cotton Bordeaux red shades of about the same color as Example 15, that is to say yellower than Example 13.

Example 18

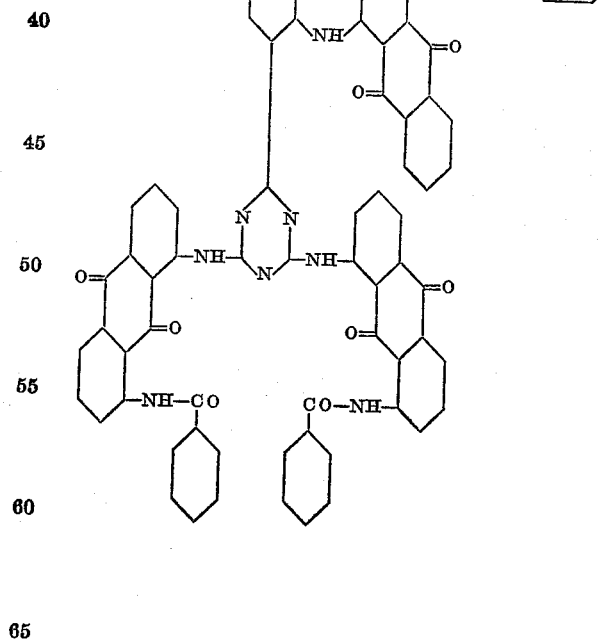

Ten parts of anhydrous aluminum chloride and 40 parts of mononitrobenzene are fused at 60° C. Three and five-tenths parts of the product of Example 17 is added gradually and the mixture is stirred at 60°–65° C. until the reaction is substantially complete. The mixture is then drowned in an excess of dilute sodium hydroxide. The mononitrobenzene is removed by steaming, and the product is isolated by filtration and washing. An excellent yield is obtained of a product which dyes cellulose fabrics fast brown shades from a red vat.

Example 19

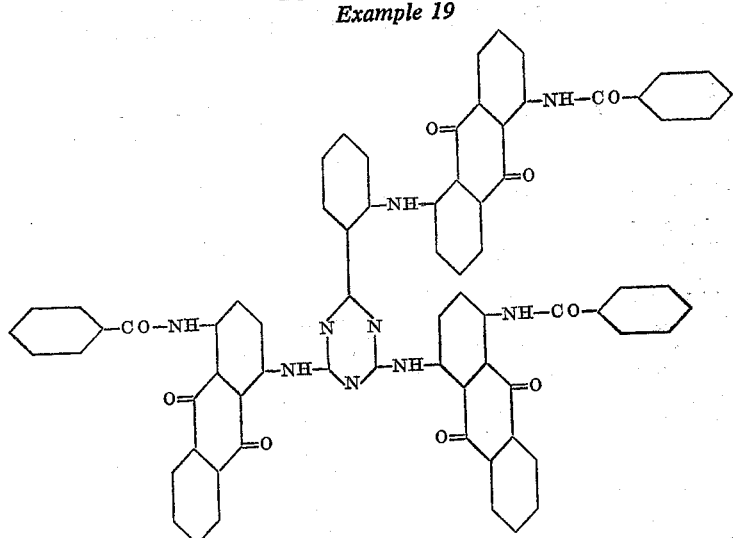

Ten and five-tenths parts of 2-(o-chlorophenyl)-4,6-di-(4'-benzamido-1'-anthraquinonylamino)-1,3,5-triazine, 4.1 parts of 1-amino-5-benzamidoanthraquinone, 3 parts of sodium carbonate, 1.5 parts of anhydrous sodium acetate, and 0.3 part of cuprous bromide are added to 75 parts of molten naphthalene at about 100° C. The mixture is then stirred at 205°—210° C. until the reaction is substantially complete. The mass is cooled to about 150° C. and diluted with 150 parts of chlorobenzene. The mixture is filtered and the product is washed with chlorobenzene and acetone. Inorganic impurities are removed by hot extraction with dilute hydrochloric acid. The dyestuff, obtained in excellent yield, dissolves in concentrated sulfuric acid with a violet-red color and dyes cellulose fibers strong copper-brown shades of excellent fastness from a violet-brown vat.

Example 20

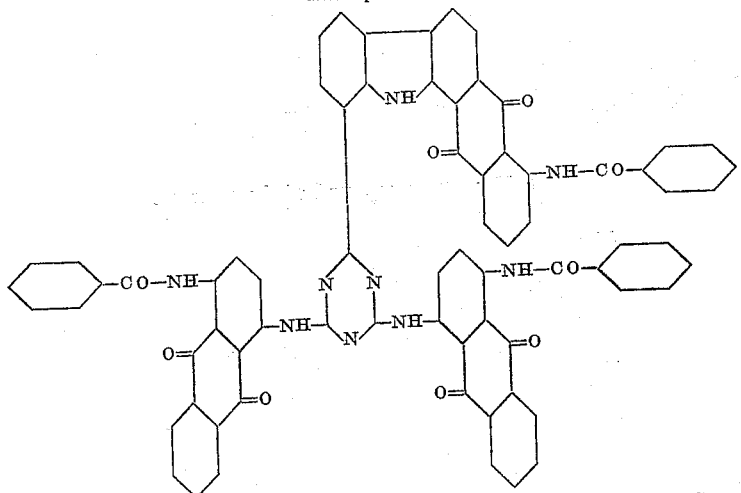

The procedure of Example 18 is followed except that instead of using the product of Example 15 an equivalent amount of the product of Example 19 is used. An excellent yield of dyestuff is obtained which dyes cellulose fabrics fast brown shades which are a somewhat yellower shade of brown than in the case of dyestuff of Example 16.

I claim:

1. Compounds of the formula

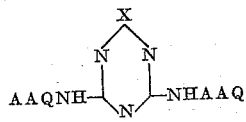

in which AAQ is an alpha-anthaquinonyl radical and X is a member of the group consisting of

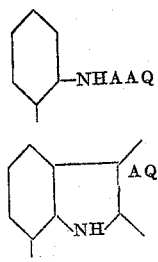

where AAQ has the same meaning as above and LAQ is an anthraquinone radical linked to the NH in an alpha position.

2. Compounds having the formula

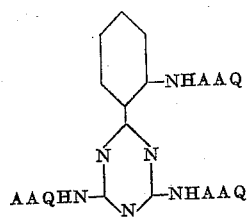

in which AAQ is an alpha-anthraquinonyl radical.

3. Compounds having the formula

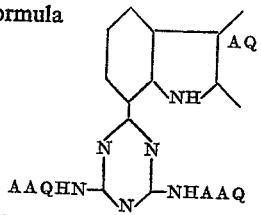

in which AAQ stands for an alpha-anthraquinonyl radical and [AQ stands for an anthraquinone radical linked to the NH in an alpha position.

4. Compounds according to claim 2 in which the alpha-anthraquinonylamino group attached to the phenyl group is substituted by an alpha-benzoylamino group.

5. Products according to claim 3 in which the radical [AQ contains an alpha-benzoylamino substituent.

6. Compounds according to claim 2 in which the alpha-anthraquinonyl group attached to phenyl contains a 5-benzoylamino group.

7. Compounds according to claim 2 in which the alpha-anthraquinonylamino group attached to phenyl contains a 4-benzoylamino group.

8. Compounds according to claim 3 in which the anthraquinone radical [AQ contains a 4-benzoylamino substituent.

9. Compounds according to claim 3 in which the anthraquinone group [AQ contains a 5-benzoylamino substituent.

10. Compounds according to claim 2 in which the alpha-anthraquinonylamino groups attached to the triazine ring contain each a benzoylamino group as a substituent.

11. Products according to claim 10 in which the benzoylamino group is in the 4 position.

12. Compounds according to claim 3 in which each of the alpha-anthraquinonylamino groups attached to the triazine ring carries an alpha-benzoylamino group as a substituent.

13. Products according to claim 12 in which the benzoylamino substituent is on the 4 position.

14. The new compound of the structure

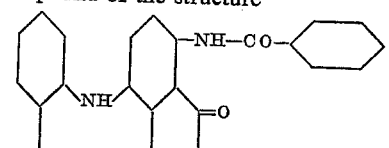

15. The new compound having the structure

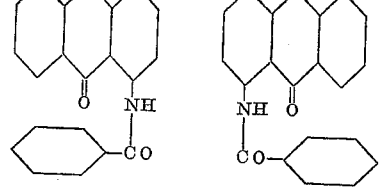

16. The new compound having the structure

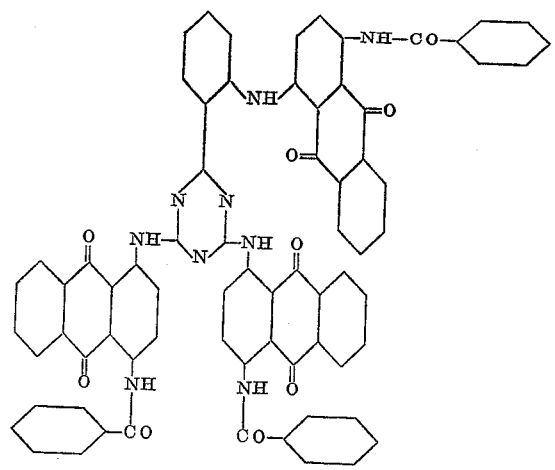

17. The new compound having the structure

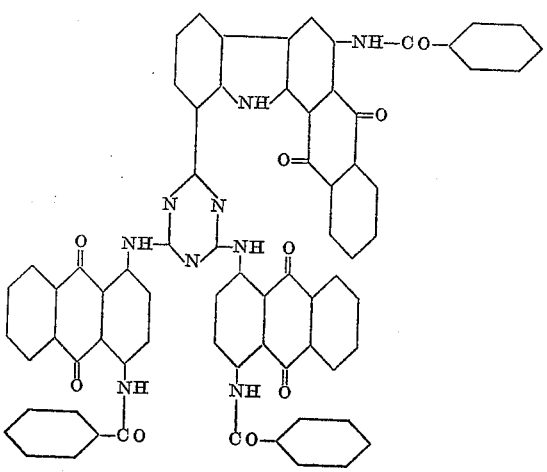

18. The new compound of the structure

References Cited in the file of this patent
FOREIGN PATENTS

| | | |
|---|---|---|
| 449,477 | Great Britain | June 24, 1936 |
| 796,539 | France | 1936 |